US007257684B1

(12) United States Patent
Sinha et al.

(10) Patent No.: US 7,257,684 B1
(45) Date of Patent: Aug. 14, 2007

(54) METHOD AND APPARATUS FOR DYNAMICALLY ALTERING ACCESSING OF STORAGE DRIVES BASED ON THE TECHNOLOGY LIMITS OF THE DRIVES

(75) Inventors: Amar Nath Sinha, Arvada, CO (US); Michael Steven Milillo, Louisville, CO (US)

(73) Assignee: Storage Technology Corporation, Louisville, CO (US)

( * ) Notice: Subject to any disclaimer, the term of this patent is extended or adjusted under 35 U.S.C. 154(b) by 428 days.

(21) Appl. No.: 10/852,821

(22) Filed: May 25, 2004

(51) Int. Cl.
*G06F 12/00* (2006.01)

(52) U.S. Cl. .................................. 711/154; 711/165
(58) Field of Classification Search ................ 711/165, 711/112, 114, 154
See application file for complete search history.

(56) References Cited

U.S. PATENT DOCUMENTS

| 4,103,338 | A | 7/1978 | Cizmic et al. ............. 364/900 |
| 4,633,387 | A | 12/1986 | Hartung et al. ............ 364/200 |
| 5,961,613 | A | 10/1999 | DeNicola ..................... 710/18 |
| 6,108,684 | A | 8/2000 | DeKoning et al. .......... 709/105 |
| 6,240,527 | B1 | 5/2001 | Schneider et al. ............ 714/21 |
| 6,275,898 | B1 * | 8/2001 | DeKoning .................. 711/114 |
| 6,405,284 | B1 | 6/2002 | Bridge ....................... 711/114 |
| 2002/0053046 | A1 | 5/2002 | Gray et al. ................... 714/42 |
| 2002/0103969 | A1 * | 8/2002 | Koizumi et al. ............ 711/114 |
| 2002/0156974 | A1 | 10/2002 | Ulrich et al. ............... 711/114 |
| 2002/0194251 | A1 | 12/2002 | Richter et al. ............. 709/105 |
| 2003/0056156 | A1 | 3/2003 | Sauvage et al. .............. 714/47 |

* cited by examiner

*Primary Examiner*—Hiep T. Nguyen
(74) *Attorney, Agent, or Firm*—Brooks Kushman P.C.

(57) ABSTRACT

A method and apparatus are disclosed for dynamically altering accessing of storage drives based on the technological limits of the drives. Operating parameters are set for each drive based on the technological limits for accessing that drive's type of technology. The operating parameters are then monitored during accessing of each one of the storage drives. The ones of the storage drives that have exceeded the operating parameters are identified. The accessing of the identified storage drives is altered so that none of the storage drives exceeds the operating parameters.

17 Claims, 10 Drawing Sheets

| WRITE CYCLE QUEUE-DRIVE1 |
|---|
| TOTAL NUMBER OF WRITES TO ALL CLUSTERS IN DRIVE 1 |

*FIG. 4a*

| DELTA TIME QUEUE-DRIVE 1 |
|---|
| DELTA TIME-VOLUME A, CLUSTER 1 |
| DELTA TIME-VOLUME A, CLUSTER 2 |
| DELTA TIME-VOLUME B, CLUSTER 1 |
| DELTA TIME-VOLUME B, CLUSTER 2 |

*FIG. 4b*

| TIME STAMP QUEUE-VOLUME A |
|---|
| DRIVE 1, CLUSTER 1, START TIME 1 |
| DRIVE 2, CLUSTER 3, START TIME 2 |
| DRIVE 2, CLUSTER 4, START TIME 3 |
| DRIVE 1, CLUSTER 1, START TIME 4 |
| DRIVE 1, CLUSTER 1, START TIME 5 |

*FIG. 4c*

| HIGH ACTIVITY QUEUE-DRIVE 1 ||
|---|---|
| VOLUME/CLUSTER | FLAG |
| VOLUME A, CLUSTER 1 | 0 |
| VOLUME A, CLUSTER 2 | 1 |
| VOLUME B, CLUSTER 1 | 0 |
|  |  |

*FIG. 4d*

| MIGRATION QUEUE-VOLUME A |
|---|
| DRIVE 1/CLUSTER 1 |
|  |
|  |
|  |
|  |

*FIG. 4e*

| MIGRATED COMPLETE QUEUE-DRIVE 3 |
|---|
| VOLUME A/CLUSTER 1/DRIVE 1 |
|  |
|  |
|  |
|  |

*FIG. 4f*

METHOD AND APPARATUS FOR DYNAMICALLY ALTERING ACCESSING OF STORAGE DRIVES BASED ON THE TECHNOLOGY LIMITS OF THE DRIVES

BACKGROUND OF THE INVENTION

1. Field of the Invention

The present invention relates generally to data storage drives, and particularly to a method and apparatus for dynamically altering the accessing of storage drives based on the technology limits of the drives. Still more particularly, the present invention provides a method and apparatus which permits using low duty cycle drives for high duty cycle applications without using write duty cycle throttling or needing drive recovery.

2. Background of the Invention

A data storage subsystem is a peripheral of a computer system and is used to store data for the computer system. A data storage subsystem typically includes one or more disk or tape drives and a controller for managing the drives included in the storage subsystem. A data storage subsystem is not a stand alone computer system. Although a storage subsystem does execute an operating system, users may not interact directly with the storage subsystem. A user may interact directly with computer systems, but may not interact directly with a data storage subsystem.

Disk drives are designed to operate up to a maximum access rate. Thus, some drives are implemented with a technology that is considered to be low duty cycle such that the maximum access rate is low; while other drives are implemented with a technology that is considered to be high duty cycle with higher access rates. High duty cycle technology drives can be accessed reliably more rapidly than the low duty cycle technology drives. When a low duty cycle disk drive is used for high duty cycle applications that execute accesses more rapidly, data being written on the drive can be corrupted. The data corruption occurs because the head on a disk drive, which is designed using a technology that supports only slower accesses, is exposed to a heavy write activity that exceeds the upper limits of the low duty cycle technology. The head gets hot which results in bad data being written to the disk drive. This problem results in disk media failure which results in loss of the disk drive. The heat problem can also be caused in a similar manner by heavy read activity.

The prior art solution to fix this problem is to throttle the disk drive write activity by keeping track of the write duty cycle on a drive within a particular period of time. This approach addresses the problem after the problem has already occurred at the disk drive.

Therefore, the current technology would be improved by a method and apparatus for dynamically altering the accessing of storage drives based on the technology limits of the drives.

SUMMARY OF THE INVENTION

A method and apparatus are disclosed for dynamically altering accessing of storage drives based on the technological limits of the drives. Operating parameters are set for each drive based on the technological limits for accessing that drive's type of technology. The operating parameters are then monitored during accessing of each one of the storage drives. The ones of the storage drives that have exceeded the operating parameters are identified. The accessing of the identified storage drives is altered so that none of the storage drives exceeds the operating parameters.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4a illustrates a write cycle queue, associated with a particular storage drive, in accordance with the present invention;

FIG. 4b depicts a delta time queue, associated with a particular storage drive, in accordance with the present invention;

FIG. 4c illustrates a time stamp queue, associated with a particular volume, in accordance with the present invention;

FIG. 4d depicts a high activity queue, associated with a particular storage drive, in accordance with the present invention;

FIG. 4e illustrates a migration queue, associated with a particular volume, in accordance with the present invention;

FIG. 4f depicts a migrated complete queue, associated with a particular storage drive, in accordance with the present invention;

DETAILED DESCRIPTION OF THE PREFERRED EMBODIMENT

Figure 1:
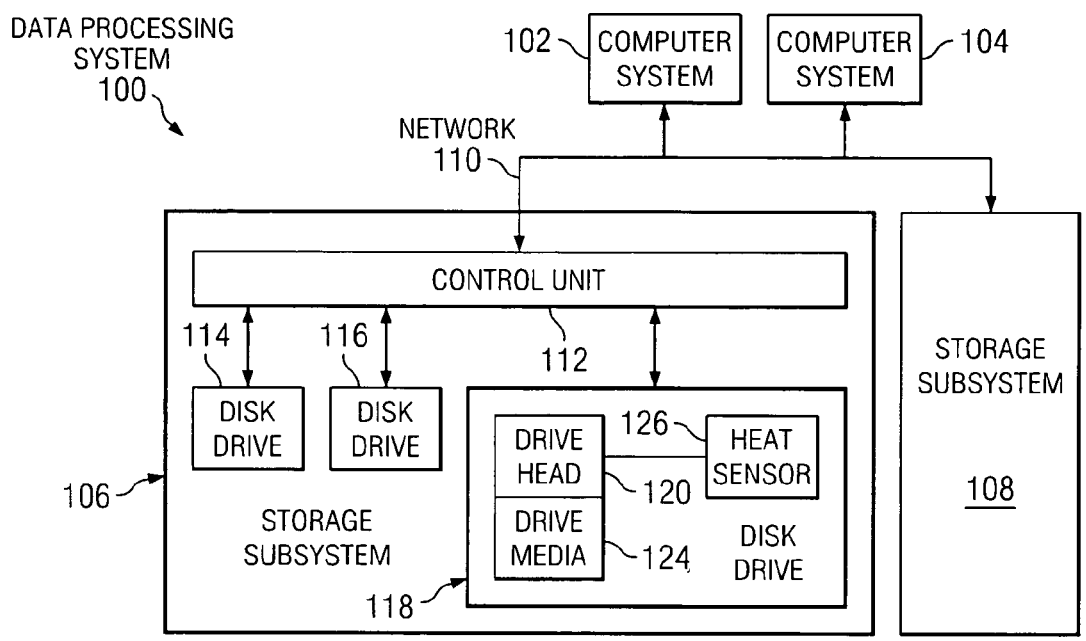
FIG. 1 is a high level block diagram of a data processing system that includes computer systems and storage subsystems in accordance with the present invention.

The present invention is a method and apparatus for dynamically altering accessing of storage drives based on the technology limits of the drives. The different types of technologies that may be used to implement a drive include high duty cycle drives, low duty cycle drives, FibreChannel drives, SATA drives, optical drives, and tape drives. Of course, other types of technologies may also exist and are not described herein. The present invention should be understood to be applicable to environments that include any type of technology of any type of storage drive.

One embodiment of the present invention describes an environment where drives that are implemented using low duty cycle technology are being for high duty cycle applications. High duty cycle applications require more frequent accessing of the storage drives. Using a low duty cycle technology for high duty cycle applications can result in data corruption because the low duty cycle drive technology is not designed for such applications. The present invention may be used when a low duty cycle technology drive is used in a high duty cycle application to determine when the storage drive is being pushed passed its technology limits so as to reduce and eliminate data corruption.

In particular, one embodiment describes monitoring storage drive usage and selecting clusters in the drives for migration. A data processing system typically includes at least one storage subsystem which includes one or more storage drives, such as hard disk drives. These disk drives are not typically accessed uniformly. At times, portions of one or more of the drives will be written to or read from at rates that far exceed the rate other portions are accessed. Each physical portion of a physical drive is referred to herein as a "cluster". As described above, if the rate that a cluster is accessed, either by writing to or reading from the cluster, approaches or exceeds a maximum rate for which the drive was designed, data corruption can occur.

The present invention provides a method and apparatus for monitoring the usage of each cluster within a low duty cycle technology drive to determine if the low duty cycle technology drive is being used in a manner that exceeds its technological limits. If the low duty cycle technology drive is being used in a manner that exceeds or approaches its technology limits, a lower activity low duty cycle technology drive and cluster within that drive is selected to which to migrate the work.

The present invention may be used to monitor reads from each cluster, writes to each cluster, or a combination of reads and writes to a cluster. For the purpose of simplicity, the following description describes only write activity. However, the following can be implemented in a similar manner to monitor read activity, or a combination both read and write activity.

One or more disk drives may be logically divided into logical volumes. A logical volume is a logically designated portion of one or more physical drives that includes selected clusters.

Each disk drive is divided into physical clusters. A logical volume includes designated clusters in one or more drives. Reads and writes specify a logical volume and cluster within a drive to access.

The present invention begins by collecting write samples to analyze. Each time a write occurs, a time stamp is stored in a time stamp queue. A time stamp queue is created for each volume. Each time stamp in a volume's time stamp queue includes an identification of the drive and cluster which were written to, as well as the time the write occurred.

After a sufficient number of samples are collected, the samples are analyzed to determine whether each cluster in the volume is being accessed too quickly, i.e. whether enough time elapses between writes to the cluster. The samples are analyzed by determining the elapsed time between writes to the same cluster. A delta time is described below. The delta time is the elapsed time between writes to the same cluster. Thus, the delta time between the samples is determined for each cluster.

Data available from the manufacturer of the drives will be used to set some parameters. One of these parameters is a minimum delta time. The minimum delta time is the minimum acceptable time between accesses to the same cluster in the drive. Thus, neither writes nor reads can occur more rapidly than the minimum delta time.

For example, if the minimum delta time is one second, there must be one second between writes, between reads, or between a write and a read. The value of one second as the minimum delta time is chosen for convenience. Actual minimum delta times are typically on the order of milliseconds.

In addition to the minimum delta time, thresholds are also set. These thresholds will be used during monitoring of drive activity in order to characterize the drive activity. These thresholds may be adjusted dynamically as the drives are accessed according to system performance or other criteria. Thus, if the system is not performing well, these thresholds may be adjusted during execution to improve the performance.

A low and a high threshold are set for write activity. A low and a high threshold are set for a time period. These thresholds will be described in more detail below.

For each cluster, the delta time between the last two writes to the cluster is compared to the minimum delta time. If a delta time for a cluster indicates that the writes are occurring too quickly, the cluster is identified within a high activity queue as being a cluster to continue to monitor. According to the preferred embodiment, a determination is made that writes are occurring too quickly when the writes are within 40% of the minimum delta time. Thus, if the minimum delta time is one second, it is determined that writes are occurring too quickly when the time between writes to a cluster is 1.4 seconds or less. A high activity queue is created for each drive. An entry is stored in the high activity queue for each one of the drive's clusters for which writes may be occurring too quickly.

A range of values between 40% and 60% of the minimum delta time is described herein. It should be understood that the selection of the values is provided merely as an example. Any value could be chosen to define the range. For example, the range could be between 23% and 72%.

Writes are continued to be processed until the low time threshold occurs. When the low time threshold occurs, a determination is made as to whether the low write activity threshold was met. If it was not met, it is determined that the write activity is not high enough to cause a problem and the process starts again by taking new samples. If the low write activity is met, further monitoring is done.

During this further monitoring, the clusters identified by the high activity queue have their activity monitored. If the writes slow to a predetermined level, the cluster is no longer identified by the high activity queue. If the writes are within a predetermined range, write activity continues to be monitored until either the writes slow to the predetermined level such that the cluster is removed from the high activity queue and no longer monitored, or either the high time threshold or the high write activity threshold is met. If either the high time or high write activity threshold is met, cluster monitoring is completed and migration decisions are made.

Migration decisions are made for all clusters that remain identified by the high activity queue once either the high time or high write activity threshold is met. Writes to these clusters will be migrated from these clusters to clusters in drives that are identified as low activity drives.

A write cycle queue is created for each drive. Each time a write occurs to a cluster within a drive, a value stored within the write cycle queue is incremented. In this manner, a drive's write cycle queue can be used to identify low activity drives. In this manner, individual clusters may be migrated from a drive that is being accessed too quickly to a drive that has low write activity.

According to other embodiments of the present invention, accessing of storage drives may be altered by monitoring the drive head activity in each drive. The drive head activity is quantified by monitoring the current heat of the head using a heat sensor that is coupled to the head. A temperature threshold is set for each type of technology. The heat of the drive head in each drive is then monitored. When the heat exceeds the threshold for that drive's type of technology, the way in which the drive is accessed is changed.

Another embodiment of the present invention provides for accessing of a drive to be altered in response to a command from a user. A user may specify a particular drive. Accessing of that drive could then be altered according to one of the methods described below.

Another embodiment of the present invention provides for altering the accessing of a drive based on a drive's technology profile. A technology profile may be created for each type of technology.

A technology profile would include a parameter for different types of accesses for a particular technology. For example, a parameter could be set for the number of reads, number of writes, total I/Os, percentage of total I/Os that are reads, percentage of total I/Os that are writes, percentage of total I/Os that are random sequence operations, and percentage of total I/Os that are sequential I/O operations for a particular technology. Each parameter would be defined for each type of technology. These parameters could be created by considering manufacturing data and then could be adjusted as appropriate later during operation.

The parameters would include an indication of which parameters provide a good indication of accessing demands for a technology. For example, a parameter that indicates the total number of accesses, including both reads and writes, might be best suited for determining whether low duty cycle drives are being accessed in a manner that exceeds their technological limits.

Many different actions may be taken in order to alter the accessing characteristics of a drive. For example, accesses may be migrated to another drive, data may be copied, and/or certain operations may be allowed or disallowed. The order of reads and writes may be changed. The different I/Os may be reordered in order to minimize the movement of the drive arm. Data may be cached.

A drive may be selected to be the destination of data migrations based on the technology profiles, specific user specifications, or type of current accessing activity. For example, as described in more detail below, a lower activity low duty cycle technology drive may be selected to which to migrate work.

FIG. 1 is a high level block diagram of a data processing system 100 that includes computer systems and storage subsystems in accordance with the present invention. Data processing system 100 includes a computer system 102 and a computer system 104 that are coupled to storage subsystem 106 and storage subsystem 108 via a network 110. Computer systems 102 and 104 are standalone computer systems. A storage subsystem is not a standalone computer system. A user may not interact directly with the storage subsystem. A user must use one of the computer systems in order to access a storage subsystem.

Each storage subsystem includes a controller and one or more disk or tape drives. For example, storage subsystem 106 includes a control unit 112 and disk drives 114, 116, and 118.

Each disk drive may include an operating parameter detector. This operating parameter detector is used to determining current operating parameters for each drive. For example, the operating parameter that may be detected is the current temperature of the drive head. Drive 118 includes a drive head 120 which reads data from and writes data to the drive's media 124. Drive 118 includes a heat sensor 126 that is coupled to and monitors the operating parameters of drive head 120. In this manner, heat sensor 126 can monitor the current operating temperature of drive head 120. This current operating temperature can be compared to a preset temperature threshold to determine whether drive 118 is reaching its technological limits for being accessed.

Figure 2:
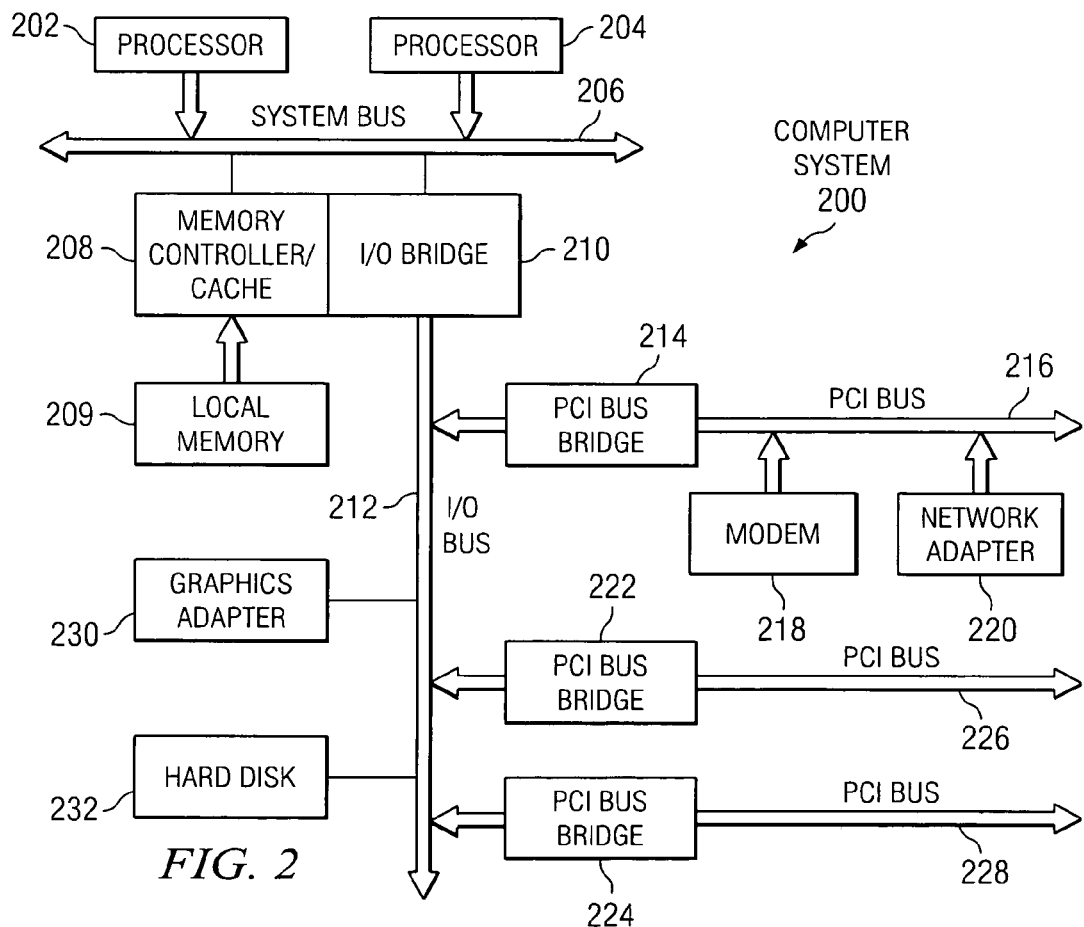
FIG. 2 depicts a block diagram of a computer system that may be used to implement one of the computer systems depicted by FIG. 1 in accordance with the present invention.

FIG. 2 depicts a block diagram of a computer system that may be used to implement one of the computer systems of FIG. 1 in accordance with the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems, such as modem 218, may be connected to PCI bus 216. Typical PCI bus implementations will support four PCI expansion slots or add-in connectors.

A network adapter 220 is coupled to PCI bus 216 and can be used to connect data processing system 200 to a network, such as network 110 as depicted by FIG. 1. Thus, data processing system 200 can be used to implement one or both computer systems 102 and 104.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

FIG. 3 depicts storage drives, volumes, and clusters that are monitored in accordance with the present invention. Three separate drives are depicted: drive 1 300, drive 2 302, and drive 3 304. These drives, according to the illustrative embodiment, are all low duty cycle technology drives. Two logical volumes are depicted: volume A 306 and volume B 308. Each physical storage drive is divided into physical clusters. Each cluster is preferably one megabyte although any suitable size may be used. A logical volume is a logically designated portion of one or more physical drives that includes selected clusters.

For example, volume A 306 includes four clusters, cluster 1 310 and cluster 2 312 that are physically a part of drive 1 300, and cluster 3 314 and cluster 4 316 that are physically a part of drive 2 302, and no clusters in drive 3 304. Volume B 308 includes seven clusters, cluster 1 318 and cluster 2 320 that are physically a part of drive 1 300, cluster 3 322, cluster 4 324, and cluster 5 326 that are physically a part of drive 2 302, and cluster 6 328 and cluster 7 330 that are physically a part of drive 3 304.

Drive 1 300 is divided into clusters 310, 312, 318, 320, 332, and 334. Drive 2 302 is divided into clusters 314, 316, 322, 324, 326, and 336. Drive 3 304 is divided into clusters 328, 330, and 338. Each drive also includes other clusters that are not depicted.

Figure 3A:
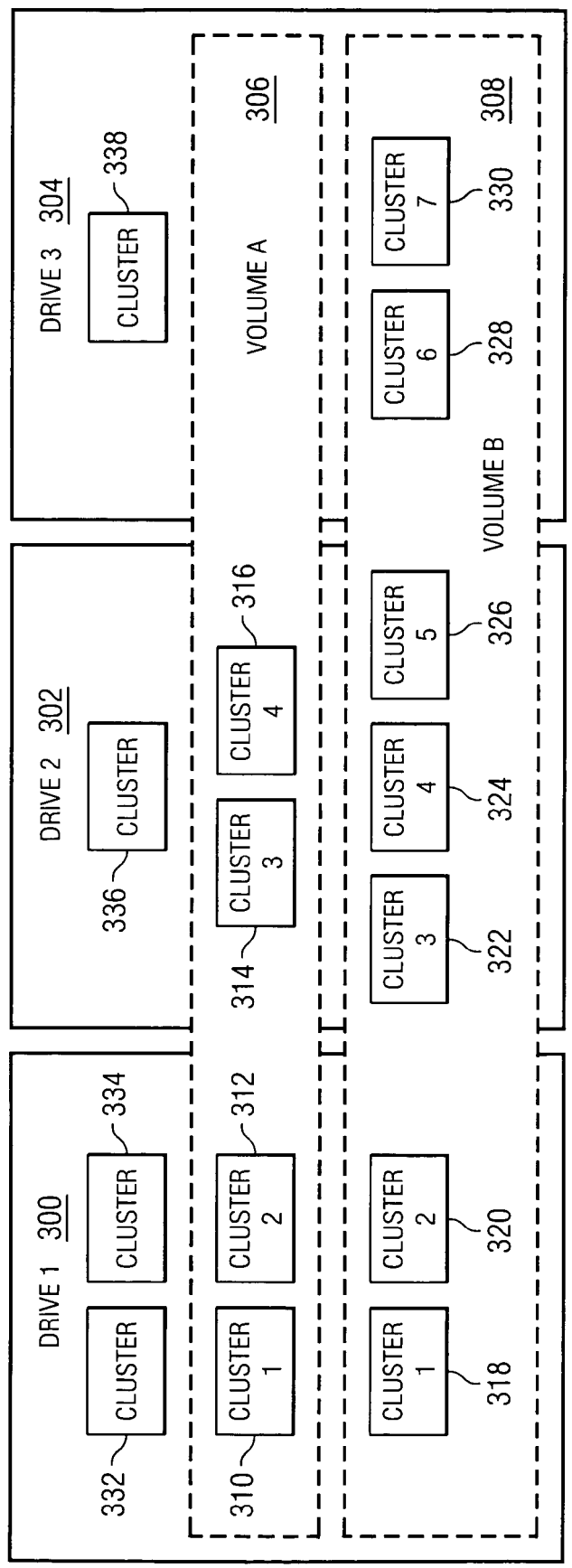
FIG. 3a illustrates storage drives, volumes, and clusters that are monitored in accordance with the present invention.
Figure 3B:
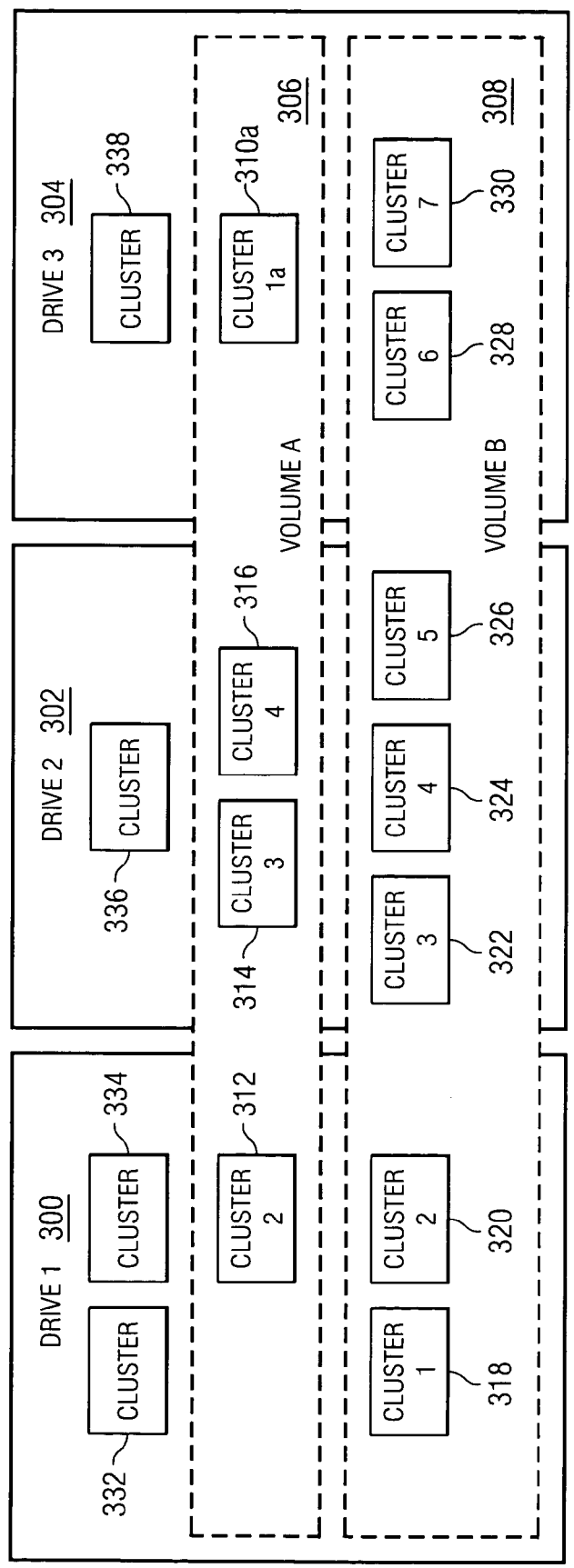
FIG. 3b illustrates the storage drives, volumes, and clusters of FIG. 3a after a cluster has been migrated in accordance with the present invention.

FIG. 3b illustrates the storage drives, volumes, and clusters of FIG. 3a after a cluster has been migrated in accordance with the present invention. As described in more detail below, it is determined that cluster 1 310 in volume A 306 (see FIG. 3a) is being written to at a rate that is undesirably frequent. Therefore, this cluster has been migrated to a lower activity low duty cycle technology drive, drive 3 304 in this example, and becomes cluster 1a 310a.

FIG. 4a illustrates a write cycle queue, associated with a particular storage drive, in accordance with the present invention. A separate write cycle queue is created for each drive in the system. For example, the write cycle queue of FIG. 4a is created for drive 1 and keeps track of the total number of writes to each and every cluster included in drive 1.

FIG. 4b depicts a delta time queue, associated with a particular storage drive, in accordance with the present invention. A separate delta time queue is created for each drive. The delta time that existed at the time the low thresholds were reached is kept for each cluster for each volume in a particular drive. For example, the delta time queue of FIG. 4b includes entries for cluster 1 310 and cluster 2 312 that are designated as part of logical volume A 306, and for cluster 1 318 and cluster 2 320 that are designated as part of volume B 308.

FIG. 4c illustrates a time stamp queue, associated with a particular volume, in accordance with the present invention. A separate time stamp queue is created for each logical volume. Each time a write occurs to any cluster in the logical volume, an entry is created and stored in the time stamp queue for that volume. Each entry identifies the drive and the cluster being written to and includes the start time when the write was executed. For example, the time stamp queue depicted by FIG. 4c includes an entry for a write that occurred at start time 1 to cluster 1 310 in drive 1 300, an entry for a write that occurred at start time 2 to cluster 3 314 in drive 2 302, an entry for a write that occurred at start time 3 to cluster 4 316 in drive 2 302, an entry for a write that occurred at start time 4 to cluster 1 310 in drive 1 300, and an entry for a write that occurred at start time 5 to cluster 1 310 in drive 1 300. An entry is created and stored within a volume's time stamp queue each time a write occurs to one of the clusters of the volume. The time stamp queue of FIG. 4c depicts only a few of the writes to volume A 306.

FIG. 4d depicts a high activity queue, associated with a particular storage drive, in accordance with the present invention. A separate high activity queue is created for each drive. An entry is created for and stored within a drive's high activity queue when the time between writes for a particular volume/cluster in that drive is approaching a heavier than desirable rate, i.e. when the delta time between writes is getting too fast. Each entry identifies a particular volume and cluster within the particular drive for which the queue was created. For example, the high activity queue of FIG. 4d was created for drive 1. Thus, the frequency of writes to each cluster identified by an entry in this queue is approaching an undesirably high rate.

A flag is associated with each entry. This flag is used to indicate whether the number of writes to a particular cluster is within a particular range. The flag is set when the delta time is within the range. If the delta time for the volume/cluster is not within the particular range, the flag is reset.

The high activity queue for drive 1 depicted by FIG. 4d includes an entry for volume A 306/cluster 1 310, for volume A 306/cluster 2 312, and for volume B 308/cluster 1 318. These clusters are being written to at a faster rate than the desirable rate. Volume A 306/cluster 2 312 is being written to at a rate that is within a particular range as indicated by the flag for its entry being set. This means that the activity for volume A 306/cluster 2 312, although high, is decreasing.

FIG. 4e illustrates a migration queue, associated with a particular volume, in accordance with the present invention. A separate migration queue is created for each volume. Each entry within the migration queue indicates a particular cluster within a particular drive that should be migrated to a lower activity drive.

For example, the migration queue of FIG. 4e includes one entry. This entry identifies drive 1 300/cluster 1 310. Thus, this cluster should be migrated from drive 1 300 to a lower activity drive.

FIG. 4f depicts a migrated complete queue, associated with a particular storage drive, in accordance with the present invention. A separate migrated complete queue is created for each low activity drive to which one or more clusters have been migrated. This queue is used to keep track of the number of clusters that have been migrated to the drive in order to ensure that the clusters are being migrated evenly to low activity drives.

The migrated complete queue of FIG. 4f was created for drive 3 304 and indicates that volume A 306/cluster 1 310 was migrated from drive 1 300.

Figure 5:
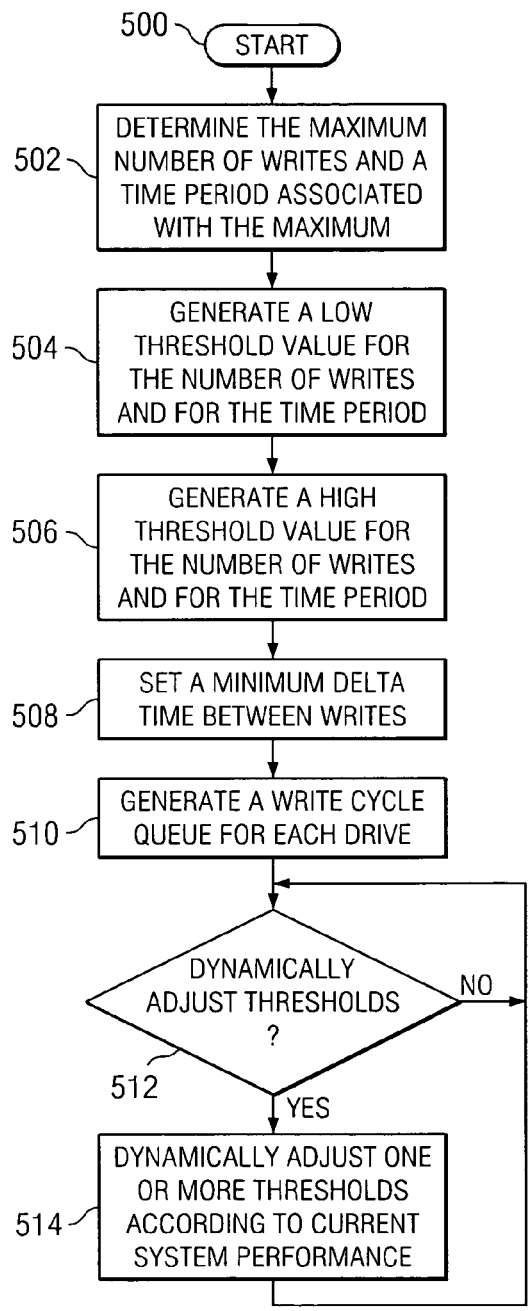
FIG. 5 illustrates a high level flow chart that depicts generating and dynamically adjusting time and quantity thresholds as well as generating write cycle queues in accordance with the present invention.

FIG. 5 illustrates a high level flow chart that depicts generating and dynamically adjusting time and quantity thresholds as well as generating write cycle queues in accordance with the present invention. The process starts as depicted by block 500 and thereafter passes to block 502 which illustrates determining the maximum number of writes and a time period associated with the maximum number. Next, block 504 depicts generating a low threshold value for the number of writes and a low threshold value for a time period.

The process then passes to block 506 which illustrates generating a high threshold value for the number of writes and a high threshold value for a time period. Block 508, then, depicts setting a minimum delta time between writes. Next, block 510 illustrates generating a write cycle queue for each drive. Thereafter, block 512 depicts a determination of whether or not to dynamically adjust one or more of the threshold values. These thresholds could be adjusted, for example, if there are too many migrations, too few migrations, or an incidence of data corruption that occurred because the migrations are not occurring soon enough.

Referring again to block 512, if a determination is made not to dynamically adjust any of the threshold values, the process passes back to block 512. If a determination is made to dynamically adjust one or more of the threshold values, the process passes to block 514 which illustrates dynamically adjusting one or more of the threshold values according to the current system performance. The process then passes back to block 512.

Figure 6:
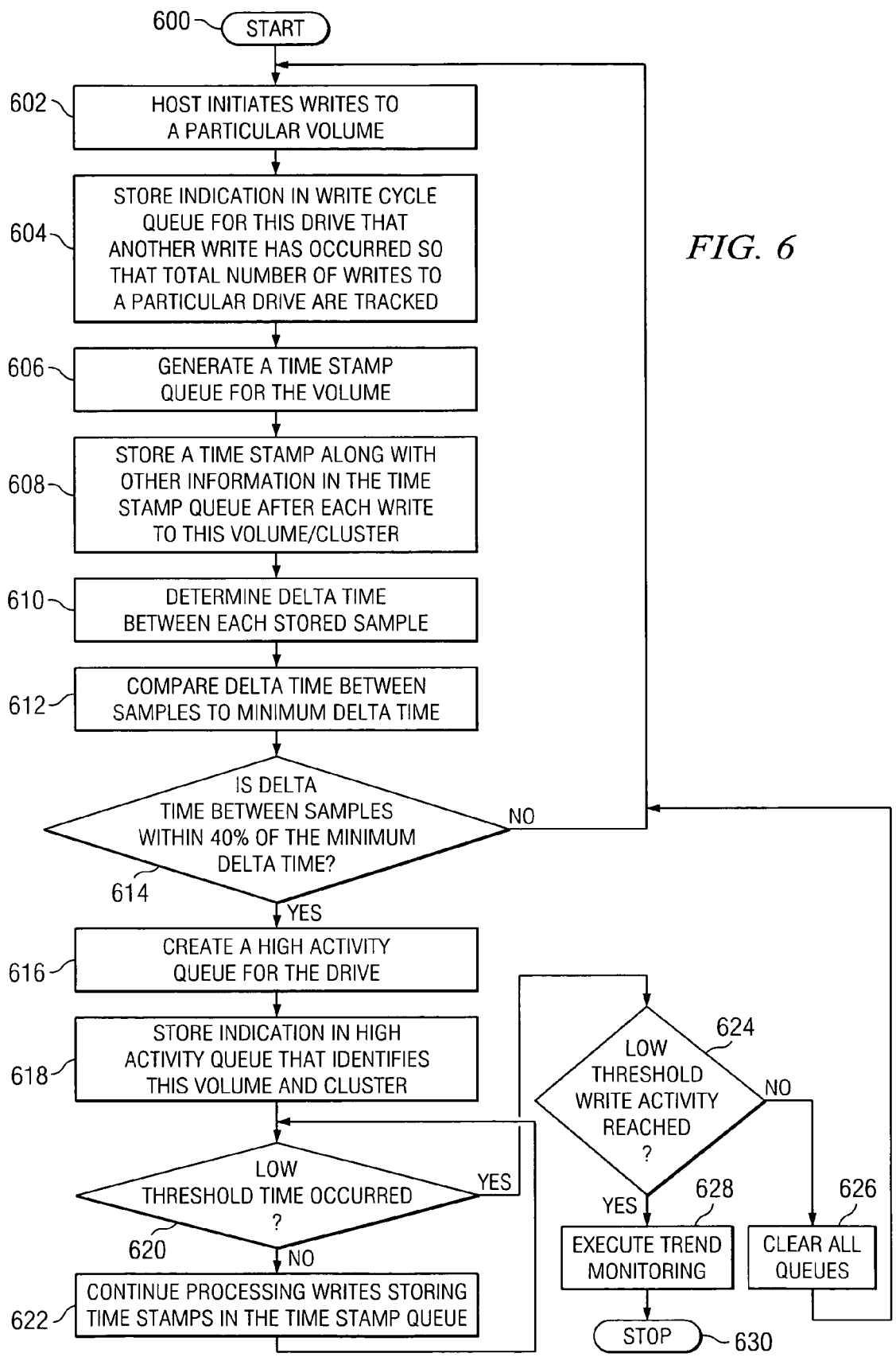
FIG. 6 depicts a high level flow chart that illustrates determining whether there are any storage drives that include clusters that are experiencing heavier than desirable use in accordance with the present invention.

FIG. 6 depicts a high level flow chart that illustrates determining whether there are any storage drives that include clusters that are experiencing heavier than desirable use in accordance with the present invention. The process starts as depicted by block 600 and thereafter passes to block 602 which illustrates the host initiating a write to a particular volume including an identification of the particular cluster to be written to and the particular drive in which this cluster is located. Next, block 604 depicts storing an indication in the write cycle queue that was created for the drive that is identified by the write command.

Block 606, then, illustrates generating a time stamp queue for the particular volume. Thereafter, block 608 depicts storing a time stamp in the time stamp queue for the particular volume. The time stamp includes an identification of the particular drive, the particular cluster, and the start time when the write was initiated. Each time a write occurs to any cluster that is designated as part of this particular volume, a time stamp is generated and stored in this time stamp queue.

The process then passes to block 610 which illustrates determining a delta time between each stored sample in the time stamp queue. Next, block 612 depicts comparing the delta time between the samples to the minimum delta time. Block 614, then, illustrates a determination of whether or not the delta time between the stored samples is within 40% of the minimum delta time. When the delta time between the stored samples to a particular volume/cluster is within 40% of the minimum delta time, the writes are occurring too quickly, i.e. too frequently, to that volume/cluster. If a determination is made that none of the writes to the clusters is occurring too quickly, the process passes back to block 602.

Referring again to block 614, if a determination is made that writes to at least one of the clusters are occurring too quickly, the process passes to block 616 which illustrates creating a high activity queue for this drive. Next, block 618 depicts storing an indication in the high activity queue that identifies this volume and cluster.

The process then passes to block 620 which illustrates a determination of whether or not the low time threshold has occurred. If a determination is made that the low time threshold has not occurred, the process passes to block 622 which depicts continuing to process writes and storing their time stamps in the time stamp queue. The process then passes to block 620.

Referring again to block 620, if a determination is made that the low time threshold has occurred, the process passes to block 624 which depicts a determination of whether or not the low write activity threshold has been reached. If a determination is made that the low write activity threshold has not been reached, the process passes to block 626 which illustrates clearing all queues. The process then passes to block 602.

Referring again to block 624, if a determination is made that the low write activity threshold has been reached, the process passes to block 628 which depicts executing trend monitoring. The process of trend monitoring is described with reference to FIGS. 7a and 7b. The process then terminates as illustrated by block 630.

Figure 7A:
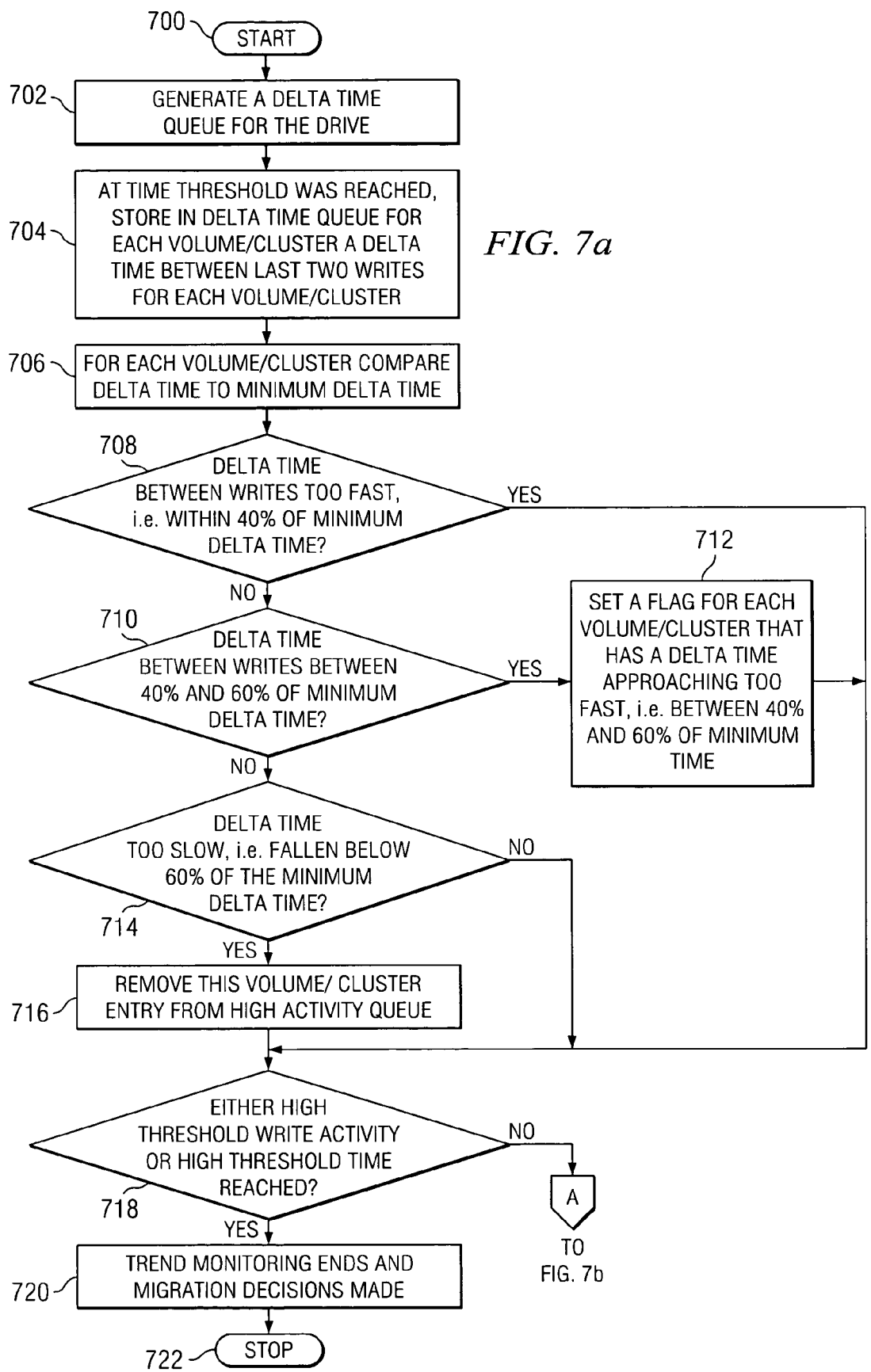
FIGS. 7a and 7b together illustrate a high level flow chart that depicts monitoring usage trends in selected storage drives in accordance with the present invention.
Figure 7B:
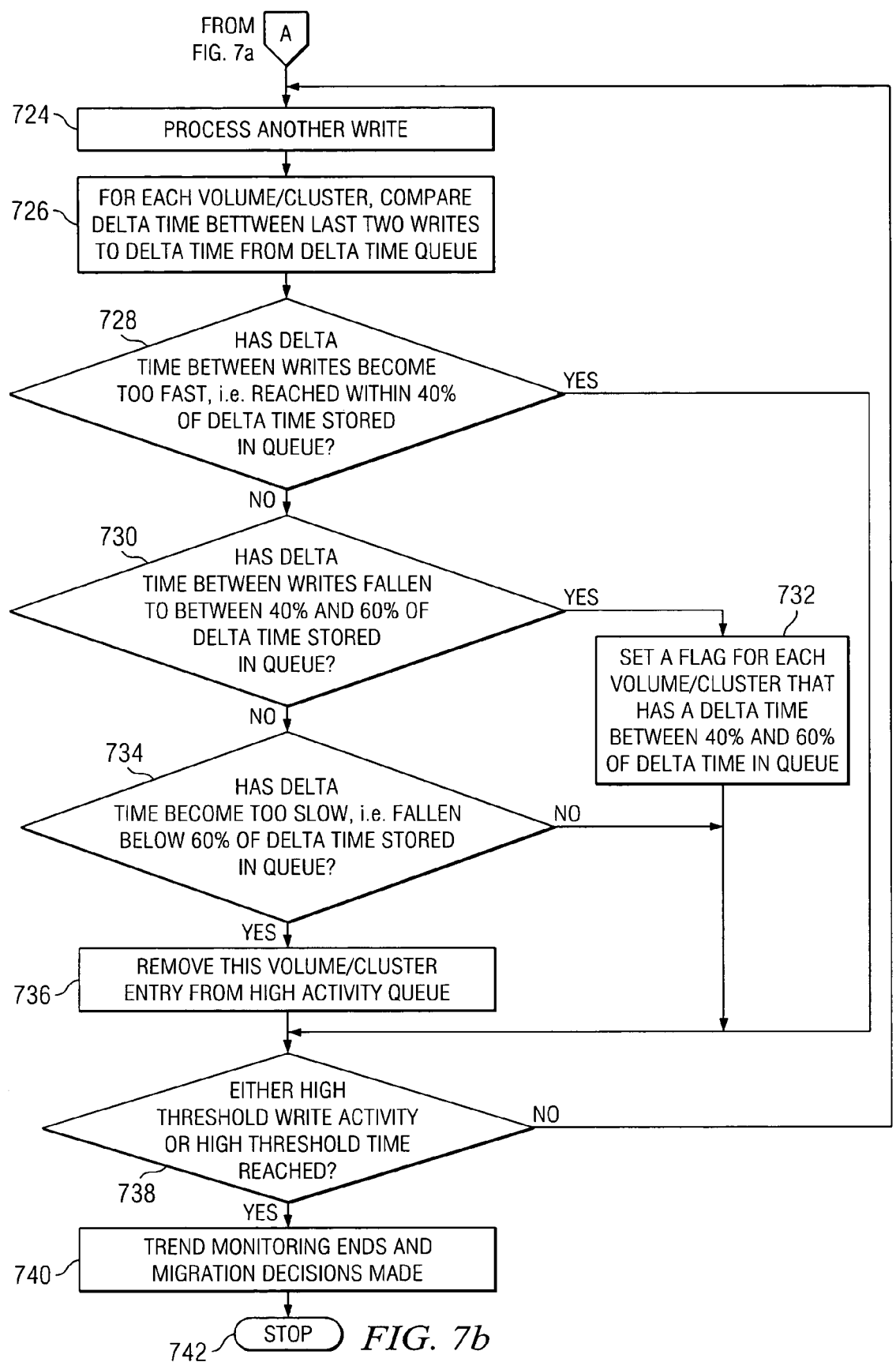

FIGS. 7a and 7b together illustrate a high level flow chart that depicts monitoring usage trends in selected storage drives in accordance with the present invention. The process starts as depicted by block 700 and thereafter passes to block 702 which illustrates generating a delta time queue for the drive. Next, block 704 depicts storing a delta time in the delta time queue for each volume/cluster. This delta time is the delta time that existed between the last two writes to a volume/cluster that occurred when the low threshold was reached. Block 706, then, depicts comparing the delta time from the delta time queue to the minimum delta time for each volume/cluster.

The process then passes to block 708 which illustrates a determination of whether or not the delta time between the writes is too fast. A threshold may be set that indicates when the delta time is too fast. For example, when the delta time is within 40% of the minimum delta time, it is determined that the delta time is too fast. For example, if the minimum delta time is one second, any delta times that are 1.4 seconds or less would be considered to be too fast.

If a determination is made that the delta time for a particular volume/cluster is too fast, the process passes to block 718. Referring again to block 708, if a determination is made that the delta time for a particular volume/cluster is not too fast, the process passes to block 710 which depicts a determination of whether or not the delta time is within a predetermined range. If a delta time is within this predetermined range, the delta time is either slow or too fast but may be approaching either slow or too fast. The predetermined range, according to the preferred embodiment, is between 40% and 60% of the minimum delta time. Thus, following the example above, a determination is made as to whether the delta time for a particular volume/cluster is between 1.4 seconds and 1.6 seconds. If a determination is made that the delta time is within the predetermined range, the process passes to block 712 which illustrates setting a flag for each volume/cluster that has a delta time that is within the predetermined range. The process then passes to block 718.

Referring again to block 710, if a determination is made that the delta time is not within the predetermined range, the process passes to block 714 which illustrates a determination of whether or not the delta time is slow. A predetermined threshold can be set that indicates when the delta time has slowed to the point where it is considered to be too slow. According to the preferred embodiment, this predetermined threshold is 60%. Following the example above with the minimum delta time being one second, a determination is made as to whether the delta time has fallen to 1.6 seconds or greater. Thus, if a determination is made that the delta time has fallen below 60% of the minimum delta time, the process passes to block 716 which depicts removing this volume/cluster entry from the drive's high activity queue. The process then passes to block 718. Referring again to block 714, if a determination is made that the delta time has not fallen below 60% of the minimum delta time, the process passes to block 718.

Block 718, then, illustrates a determination of whether or not either the high write activity threshold or the high time threshold has been reached. If a determination is made that either the high write activity threshold or the high time threshold has been reached, the process passes to block 720 which depicts the trend monitoring ending and migration decisions being made. The process terminates as illustrated by block 722.

Referring again to block 718, if a determination is made that neither the high write activity threshold nor the high time threshold has been reached, the process passes to block 724, see FIG. 7b, as depicted through connector A.

Block 724 illustrates processing another write to a particular volume/cluster. Next, block 726 depicts comparing the delta time between the last two writes to this volume/cluster to the delta time that is stored in the delta time queue for this particular volume/cluster. The process then passes to block 728 which illustrates a determination of whether or not the delta time between the writes has become too fast. According to the present invention, the delta time has become too fast when it moves within 40% of the delta time stored in the delta time queue. If a determination is made that that the delta time between writes has moved to within 40% of the delta time stored in the delta time queue, the process passes to block 738.

Referring again to block 728, if a determination is made that the delta time between writes has not moved to within 40% of the delta time stored in the delta time queue, the process passes to block 730 which illustrates a determination of whether or not the delta time is between 40% and 60% of the delta time stored in the delta time queue for this volume/cluster. If a determination is made that the delta time is not between 40% and 60% of the delta time stored in the delta time queue for this volume/cluster, the process passes to block 734.

Referring again to block 730, if a determination is made that the delta time is between 40% and 60% of the delta time stored in the delta time queue for this volume/cluster, the process passes to block 732 which depicts setting a flag for each volume/cluster that has a delta time that is between 40% and 60% of the delta time stored in the delta time queue for the volume/cluster. The process then passes to block 738.

Block 734, then, illustrates a determination of whether or not the delta time for the volume/cluster has fallen below 60% of the delta time stored in the delta time queue for the volume/cluster. If a determination is made that the delta time for the volume/cluster has fallen below 60% of the delta time stored in the delta time queue for the volume/cluster, the process passes to block 736 which depicts removing this volume/cluster from the high activity queue. The process then passes to block 738. Referring again to block 734, if a determination is made that the delta time has not fallen below 60% of the minimum delta time, the process passes to block 738.

Block 738, then, illustrates a determination of whether or not either the high write activity threshold or the high time threshold has been reached. If a determination is made that either the high write activity threshold or the high time threshold has been reached, the process passes to block 740 which depicts the trend monitoring ending and migration decisions being made. The process then terminates as illustrated by block 742. Referring again to block 738, if a determination is made that neither the high write activity threshold nor the high time threshold has been reached, the process passes back to block 724.

Figure 8:
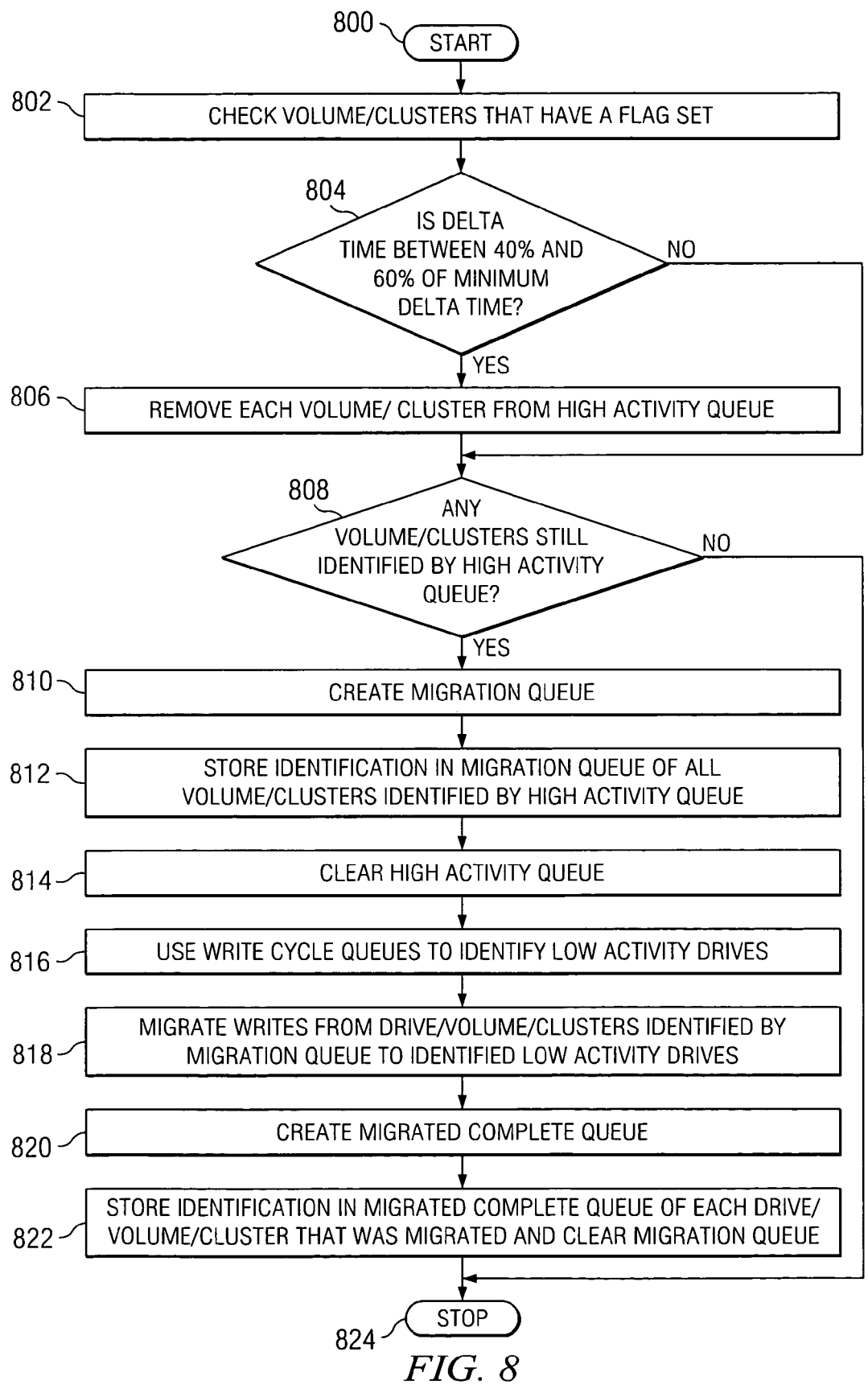
FIG. 8 depicts a high level flow chart that illustrates migrating clusters that have been experiencing more frequent than desirable use in accordance with the present invention.

FIG. 8 depicts a high level flow chart that illustrates migrating clusters that have been experiencing more frequent than desirable use in accordance with the present invention. The process starts as depicted by block 800 and thereafter passes to block 802 which illustrates checking each entry in the high activity queue to determine which volume's clusters (volume/clusters) have a flag that is set. Next, block 804 depicts a determination of whether or not the delta time between the last two writes to this volume/cluster is between 40% and 60% of the minimum delta time.

If a determination is made that the delta time between the last two writes to this volume/cluster is not between 40% and 60% of the minimum delta time, the process passes to block 808. Referring again to block 804, if a determination is made that the delta time between the last two writes to this volume/cluster is between 40% and 60% of the minimum delta time, the process passes to block 806 which illustrates removing the volume/cluster from the high activity queue.

Next, block 808 illustrates a determination of whether or not any of the volume/clusters are still identified by the high activity queue. This is a determination of whether or not there are any entries currently in the high activity queue. If a determination is made that there are no volume/clusters still in the high activity queue, the process terminates as illustrated by block 824.

Referring again to block 808, if a determination is made that there is at least one entry still in the high activity queue, the process passes to block 810 which depicts creating a migration queue for each volume that includes the volume/clusters that are still in the high activity queue. Block 812, then, illustrates storing an identification in the appropriate migration queue of all volume/clusters that are still identified by the high activity queue.

The process then passes to block 814 which depicts clearing all high activity queues. Thereafter, block 816 illustrates using the write cycle queues to identify low activity drives. Block 818, then, depicts migrating writes from the drive/volume/clusters that are identified by the migration queues to identified one or more low activity drives. Next, block 820 illustrates creating a migrated complete queue for each low activity drive. Thereafter, block 822 depicts storing an identification in the migrated complete queue of each drive/volume/cluster that was migrated, and then clearing the migration queue. The process then terminates as illustrated by block 824.

Figure 9:
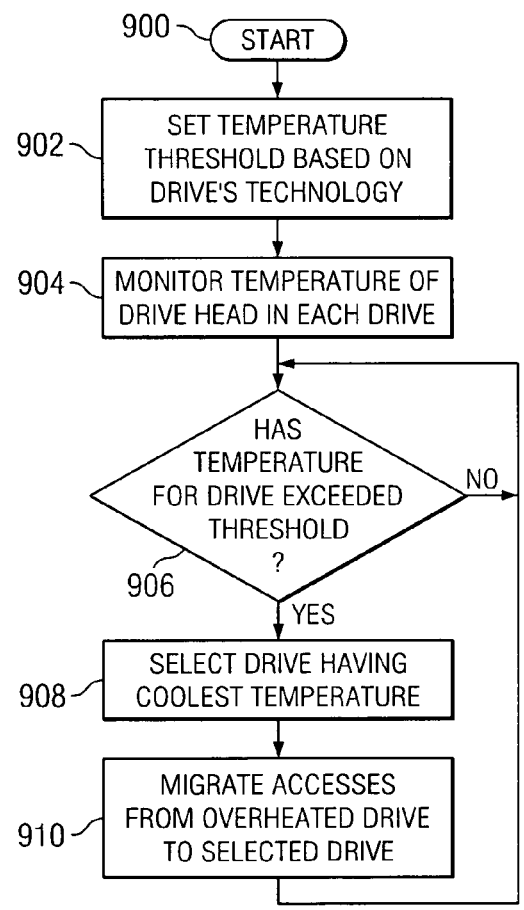
FIG. 9 illustrates a high level flow chart that depicts monitoring a drive's drive head temperature to determine whether it is being accessed in a manner that exceeds the drive's technology capabilities in accordance with the present invention.

FIG. 9 illustrates a high level flow chart that depicts monitoring a drive's drive head temperature to determine whether it is being accessed in a manner that exceeds the drive's technology capabilities in accordance with the present invention. The process starts as depicted by block 900 and thereafter passes to block 902 which illustrates setting a temperature threshold for each drive technology. Next, block 904 depicts monitoring the temperature of the drive head in each drive.

Block 906, then, illustrates a determination, for each drive, of whether or not the temperature within a drive has exceeded the threshold that was set for that drive's type of technology. If a determination is made that the temperature in a drive has not exceeded the threshold set for that drive's technology, the process passes back to block 906. If a determination is made that the temperature in a drive has exceeded the threshold set for that drive' technology, the process passes to block 908 which depicts selecting a drive that currently has the coolest drive head temperature. Those skilled in the art will recognize that other methods could be used for selecting a drive. For example, any drive that is not currently exceeding its technology's threshold could be selected. Next, block 910 illustrates migrating accesses from the overheated drive to the selected drive. The process then passes back to block 906.

Figure 10:
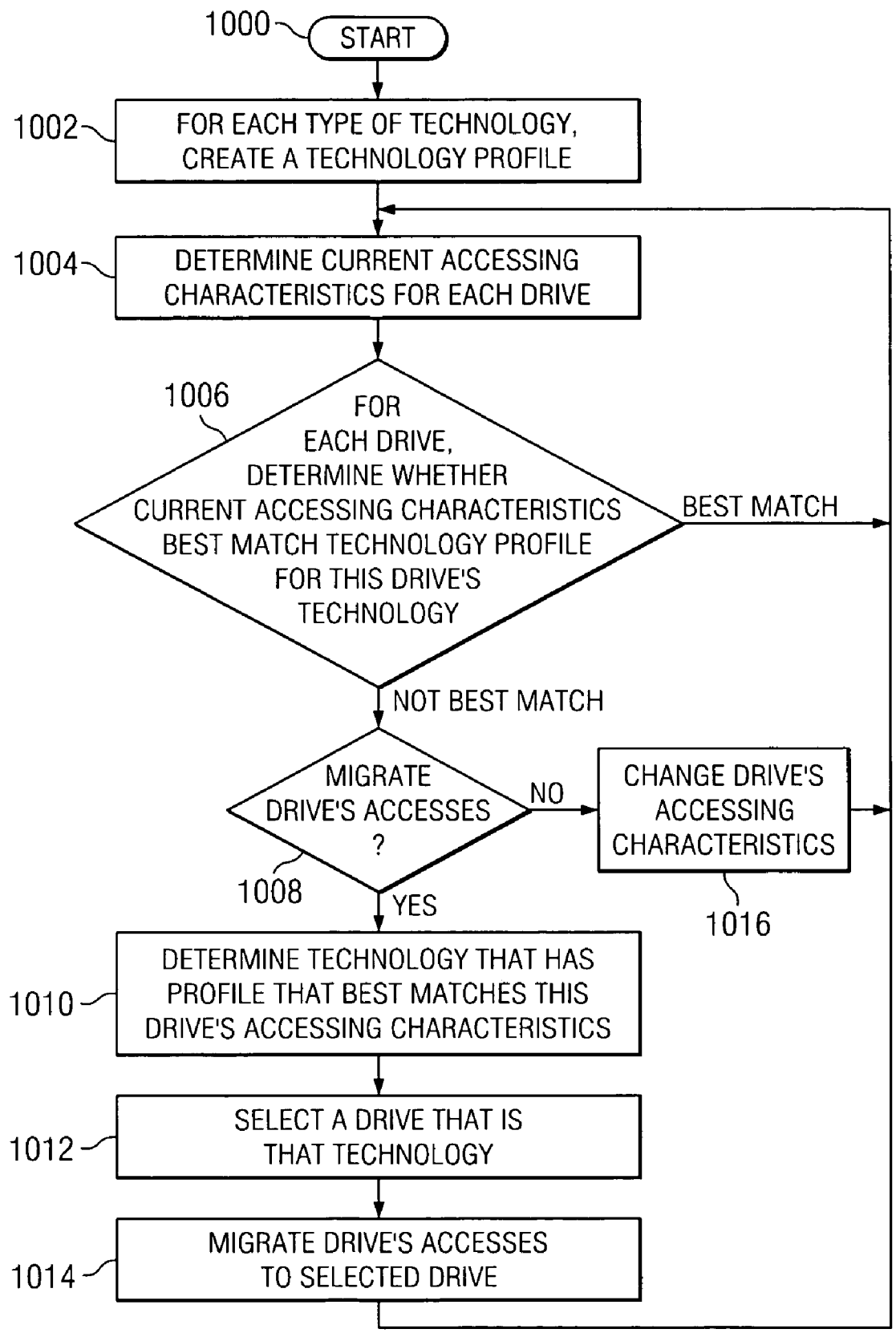
FIG. 10 depicts a high level flow chart that illustrates determining a technology profile based on the current accessing characteristics for each drive to select the technology profile that best matches the type of technology for each drive in accordance with the present invention.

FIG. 10 depicts a high level flow chart that illustrates determining a technology profile based on the current accessing characteristics for each drive to select the technology profile that best matches the type of technology for each drive in accordance with the present invention. The process starts as depicted by block 1000 and thereafter passes to block 1002 which illustrates creating a technology profile for each type of drive technology used in the system.

Next, block 1004 depicts determining the current accessing characteristics for each drive. Block 1006, then, illustrates determining whether the current accessing characteristics for each drive best matches the technology profile for the drive's technology. If a determination is made that the current accessing characteristics for each drive best matches the technology profile for the drive's technology, the process passes back to block 1004. If a determination is made that the current accessing characteristics for each drive does not best match the technology profile for the drive's technology, the process passes to block 1008.

Block 1008, then, illustrates a determination, for each drive that is being accessed in a manner that does not best fit its technology profile, of whether or not to migrate the drive's accesses. If a determination is made to migrate the drive's accesses, the process passes to block 1010 which depicts determining the technology profile that best matches this drive's accessing characteristics. Next, block 1012 illustrates selecting a drive that is that technology. Block 1014, then, depicts migrating the drive's accesses to the selected drive. The process then passes back to block 1004.

Referring again to block 1008, if a determination is made not to migrate this drive's accesses, the process passes to block 1016 which illustrates changing the drive's accessing characteristics. For example, data could be copied to another drive. Certain accesses could be allowed or disallowed. The order of reads and writes could be changed. The process then passes to block 1004.

It is important to note that while the present invention has been described in the context of a fully functioning data processing system. Those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for monitoring usage of a plurality of storage drives and automatically migrating activity from high usage storage drives to lower usage storage drives, each one of said plurality of storage drives being divided into a plurality of clusters, said method comprising the steps of:

monitoring usage of each one of said plurality of clusters in each one of said plurality of storage drives;

identifying ones of said plurality of storage drives that have a low usage;

determining, for each one of said plurality of clusters, whether said usage exceeds a predetermined threshold; and in response to a determination that said usage of one of said plurality of clusters exceeds a predetermined threshold, migrating said one of said plurality of clusters to one of said identified ones of said plurality of storage drives that have a low usage.

2. The method according to claim 1, further comprising the steps of:

determining said usage including determining a frequency of accessing for each one of said plurality of clusters.

3. The method according to claim 2, further comprising the steps of:

determining said frequency of accessing including determining a frequency of writes to each one of said plurality of clusters.

4. The method according to claim 1, further comprising the steps of:

said plurality of drives being low duty cycle technology drives; and utilizing said plurality of drives in an environment that is executing applications that need high duty cycle technology drives.

5. The method according to claim 4, further comprising the steps of:

altering a method in which said plurality of drives are accessed, to avoid data corruption in said plurality of drives, without using write duty cycle throttling.

6. The method according to claim 1, further comprising the steps of:

monitoring a frequency of accesses of each one of said plurality of clusters in each one of said plurality of storage drives;

determining, for each one of said plurality of clusters, whether said frequency exceeds a first threshold;

storing an indicator for each one of said plurality of clusters for which a determination was made that said one of said plurality of clusters is being accessed at a frequency that exceeds said first threshold; and migrating accesses from each one of said plurality of clusters for which an indicator was stored.

7. The method according to claim 6, further comprising the steps of:

determining, for each one of said plurality of clusters, whether said usage falls below a second threshold; and migrating said accesses from each one of said plurality of clusters for which an indicator was stored to one of said plurality of clusters for which a determination was made that said usage falls below said second threshold.

8. The method according to claim 1, further comprising the steps of:

monitoring a frequency of accesses of each one of said plurality of clusters in each one of said plurality of storage drives;

determining, for each one of said plurality of clusters, whether said frequency exceeds a first threshold;

storing an indicator for each one of said plurality of clusters for which a determination was made that said frequency exceeds said first threshold;

monitoring accessing, of each one of said plurality of clusters for which an indicator was stored, for a time period after said indicator was stored;

upon an expiration of said time period, determining whether a frequency of accessing each one of said plurality of clusters for which an indicator was stored still exceeds said first threshold;

determining, for each one of said plurality of clusters, whether said frequency exceeds a first threshold;

in response to said frequency of accessing each one of said plurality of clusters for which an indicator was stored still exceeding said first threshold, migrating said one of said plurality of clusters for which an indicator was stored and that still exceeds said first threshold to one of said plurality of storage drives that includes one of said plurality of clusters which has a usage that falls below said second threshold;

in response to said frequency of accessing each one of said plurality of clusters for which an indicator was stored not still exceeding said first threshold, leaving said accessing of each one of said plurality of clusters for which an indicator was stored not still exceeding said first threshold unchanged.

9. An apparatus in a data processing system for monitoring usage of a plurality of storage drives and automatically migrating activity from high usage storage drives to lower usage storage drives, each one of said plurality of storage drives being divided into a plurality of clusters, said apparatus comprising:

a CPU that is executing code for monitoring usage of each one of said plurality of clusters in each one of said plurality of storage drives;

said CPU that is executing code for identifying ones of said plurality of storage drives that have a low usage being identified;

said CPU that is executing code for determining, for each one of said plurality of clusters, whether said usage exceeds a predetermined threshold; and in response to a determination that said usage of one of said plurality of clusters exceeds a predetermined threshold, said CPU that is executing code for migrating said one of said plurality of clusters to one of said identified ones of said plurality of storage drives that have a low usage.

10. The apparatus according to claim 9, further comprising:

said CPU that is executing code for determining said usage including determining a frequency of accessing for each one of said plurality of clusters.

11. The apparatus according to claim 10, further comprising:

said CPU that is executing code for determining said frequency of accessing including determining a frequency of writes to each one of said plurality of clusters.

12. The apparatus according to claim 9, further comprising:

said plurality of drives being low duty cycle technology drives; and said plurality of drives being utilized in an environment that is executing applications that need high duty cycle technology drives.

13. The apparatus according to claim 12, further comprising:

said CPU that is executing code for altering a method in which said plurality of drives are accessed, to avoid data corruption in said plurality of drives, without using write duty cycle throttling.

14. The apparatus according to claim 9, further comprising:

a frequency of accesses of each one of said plurality of clusters being monitored in each one of said plurality of storage drives;

said CPU that is executing code for determining, for each one of said plurality of clusters, whether said frequency exceeds a first threshold;

an indicator being stored for each one of said plurality of clusters for which a determination was made that said one of said plurality of clusters is being accessed at a frequency that exceeds said first threshold; and accesses from each one of said plurality of clusters for which an indicator was stored being migrated.

15. The apparatus according to claim 14, further comprising:

said CPU that is executing code for determining, for each one of said plurality of clusters, whether said usage falls below a second threshold; and said accesses being migrated from each one of said plurality of clusters for which an indicator was stored to one of said plurality of clusters for which a determination was made that said usage falls below said second threshold.

16. The apparatus according to claim 9, further comprising:

a frequency of accesses being monitored for each one of said plurality of clusters in each one of said plurality of storage drives;

said CPU that is executing code for determining, for each one of said plurality of clusters, whether said frequency exceeds a first threshold;

an indicator stored for each one of said plurality of clusters for which a determination was made that said frequency exceeds said first threshold;

accessing, of each one of said plurality of clusters for which an indicator was stored, being monitored for a time period after said indicator was stored;

upon an expiration of said time period, said CPU that is executing code for determining whether a frequency of accessing each one of said plurality of clusters for which an indicator was stored still exceeds said first threshold;

said CPU that is executing code for determining, for each one of said plurality of clusters, whether said frequency exceeds a first threshold;

in response to said frequency of accessing each one of said plurality of clusters for which an indicator was stored still exceeding said first threshold, said CPU that is executing code for migrating said one of said plurality of clusters for which an indicator was stored and that still exceeds said first threshold to one of said plurality of storage drives that includes one of said plurality of clusters which has a usage that falls below said second threshold;

in response to said frequency of accessing each one of said plurality of clusters for which an indicator was stored not still exceeding said first threshold, said accessing of each one of said plurality of clusters for which an indicator was stored not still exceeding said first threshold being left unchanged.

17. The apparatus according to claim 9, further comprising:

a write cycle queue for one of said plurality of storage drives for storing an indication of a total number of accesses of said one of said plurality of storage drives;

a high activity queue for said one of said plurality of storage drives for storing an indication of each cluster in said one of said plurality of storage drives that has been accessed at a frequency that exceeds a first threshold; and a delta time queue for said one of said plurality of storage drives for tracking a frequency of accessing each one of said plurality of clusters that is included in said one of said plurality of storage drives.

* * * * *